United States Patent [19]

Fietsam

[11] Patent Number: 5,199,600

[45] Date of Patent: Apr. 6, 1993

[54] DISPENSER FOR STACKABLE ARTICLES

[75] Inventor: Kim C. Fietsam, New Athens, Ill.

[73] Assignee: Duke Manufacturing Co., St. Louis, Mo.

[21] Appl. No.: 580,817

[22] Filed: Sep. 11, 1990

[51] Int. Cl.$^5$ .............................................. B65H 31/20
[52] U.S. Cl. .................................... 221/241; 221/244; 211/41; 211/59.3; 312/71
[58] Field of Search .............. 221/241, 242, 244, 279, 221/304, 312 R, 59; 108/26, 44; 211/41, 59.3; 312/36, 45, 71

[56] References Cited

U.S. PATENT DOCUMENTS

| | | | |
|---|---|---|---|
| 3,214,227 | 10/1965 | Filipowicz | 221/59 X |
| 3,327,655 | 6/1967 | MacKay | 108/136 |
| 3,331,337 | 7/1967 | Mackay | 108/136 |
| 3,351,741 | 11/1967 | Shelley | 312/71 X |
| 3,426,941 | 2/1969 | Hovekamp | 221/241 X |
| 3,428,185 | 2/1969 | Vorndran | 211/49 |
| 3,863,576 | 2/1975 | Olsson | 108/136 |
| 4,206,954 | 6/1980 | Kooiman | 312/71 |
| 4,243,153 | 1/1981 | Mitchell | 221/279 X |
| 4,354,605 | 10/1982 | Brutsman | 211/49 |
| 4,441,618 | 4/1984 | Mancini | 211/49 |
| 4,503,980 | 3/1985 | Kooiman | 211/41 |
| 4,529,093 | 7/1985 | Ruiz | 211/59.2 |

FOREIGN PATENT DOCUMENTS 1414742 8/1988 U.S.S.R. .

Primary Examiner—Robert P. Olszewski
Assistant Examiner—Dean A. Reichard
Attorney, Agent, or Firm—Senniger, Powers, Leavitt & Roedel

[57] ABSTRACT

A dispenser for stackable articles such as dishes and the like. The dispenser comprises a housing having an opening in its top, a carriage for supporting a generally vertical stack of the articles, mechanism for biasing the carriage vertically upwardly in the housing to dispense the articles from the top of the housing, a plurality of elongate guide members in the housing, and apparatus for mounting the guide members. The carriage is moveable within the housing along a generally vertical central axis of the housing. The guide members are spaced about the periphery of the carriage for retaining the articles in a generally vertical stack. Each guide member has a vertically extending guide surface for slideably abutting marginal edge portions of the articles stacked on the carriage. The guide members are mounted for coordinated movement of their respective guide surfaces so that movement of one guide surface into position to accommodate articles of a particular size simultaneously moves the other guide surfaces into position to accommodate articles of that size.

13 Claims, 5 Drawing Sheets

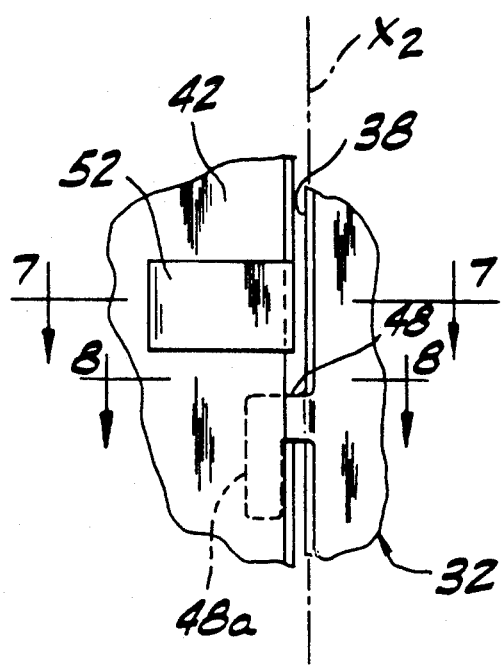
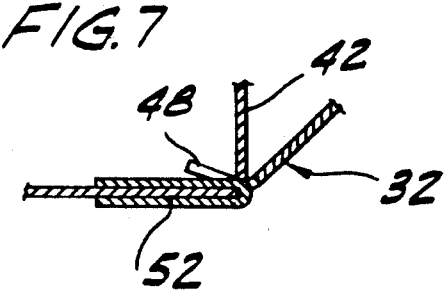
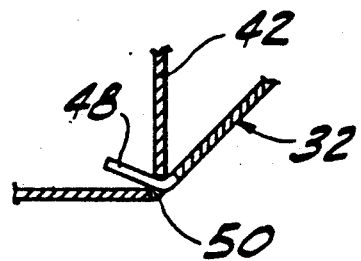
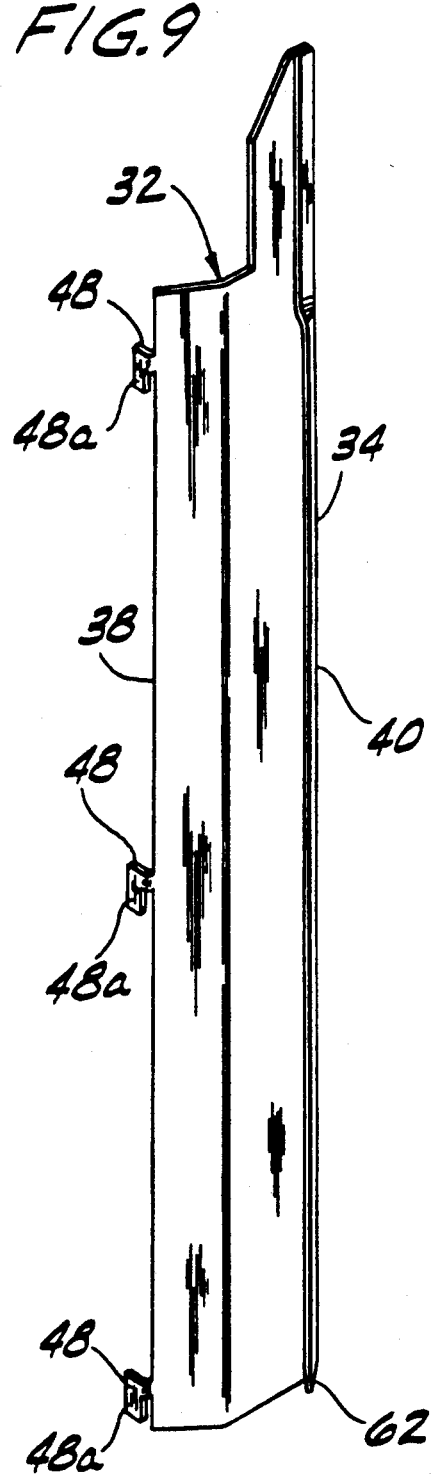

DISPENSER FOR STACKABLE ARTICLES

BACKGROUND OF THE INVENTION

This invention relates generally to apparatus for dispensing stackable articles, and more particularly to plate or dish dispensers of the type used in cafeterias or restaurants.

Self-leveling dish dispensers are commonly used in cafeterias and restaurants. A problem with most such dispensers is that they cannot readily accommodate stacks of dishes of different diameters; they can generally only accommodate stacks of one diameter. One type of dispenser, which is adjustable, includes three vertical guide rods adapted to abut the periphery of a stack of plates. The guide rods extend through holes in, and guide, a moveable carriage upon which the stack rides. To accommodate a stack having a larger or smaller diameter, the rods are removed from their respective holes and then placed through holes farther away from or closer to the center of the carriage. A disadvantage of this type of dispenser is that the guide rods are not adjusted simultaneously or dependently. Each rod must be independently removed from its respective hole and then placed through another hole through the carriage. Another disadvantage is that the stack of dishes generally must be removed before the guide rods can be adjusted. Removing the dishes and independently adjusting the rods is time consuming. Moreover, these adjustable dispensers generally only accommodate round plates.

SUMMARY OF THE INVENTION

Among the objects of the present invention may be noted the provision of an improved dispenser for stackable articles which accommodates stacks of articles of different diameters; the provision of such a dispenser having a plurality of guide members which may be quickly and easily adjusted; the provision of such a dispenser in which the adjustment of one guide member results in adjustment of the others; the provision of such a dispenser in which the guide members can be adjusted without removing the articles from the dispenser; the provision of such a dispenser which can accommodate stacks of articles having non-circular peripheries, such as a stack of oval platters; and the provision of such a dispenser which is of simple and economical construction.

Generally, a dispenser of the present invention comprises a housing having an opening in its top, a carriage for supporting a generally vertical stack of the articles, means for biasing the carriage vertically upwardly in the housing to dispense the articles from the top of the housing, a plurality of elongate guide members in the housing, and means for mounting the guide members. The carriage is moveable within the housing along a generally vertical central axis of the housing. The guide members are spaced about the periphery of the carriage for retaining the articles in a generally vertical stack. Each guide member has a vertically extending guide surface for slideably abutting marginal edge portions of the articles stacked on the carriage. The guide members are mounted for coordinated movement of their respective guide surfaces so that movement of one guide surface into position to accommodate articles of a particular size simultaneously moves the other guide surfaces into position to accommodate articles of that size.

Thus, the dispenser accommodates articles of different sizes and shapes, and can be quickly and easily reconfigured for such articles. These and other advantages will be in part apparent and in part pointed out hereinafter.

BRIEF DESCRIPTION OF THE DRAWINGS

FIG. 6 is an elevational view showing a tab of one of the guide members inserted into a slot through the housing;

FIG. 7 is a section view taken along the plane of line 7—7 of FIG. 6 showing a clip attached adjacent the slot of FIG. 6;

FIG. 8 is a section view taken along the plane of line 8—8 of FIG. 6 showing the tab of one of the guide members inserted through the slot; and FIG. 9 is a perspective view of one of the guide members.

Corresponding reference numerals indicate corresponding parts throughout the several views of the drawings.

DETAILED DESCRIPTION OF THE PREFERRED EMBODIMENT

Figure 1:
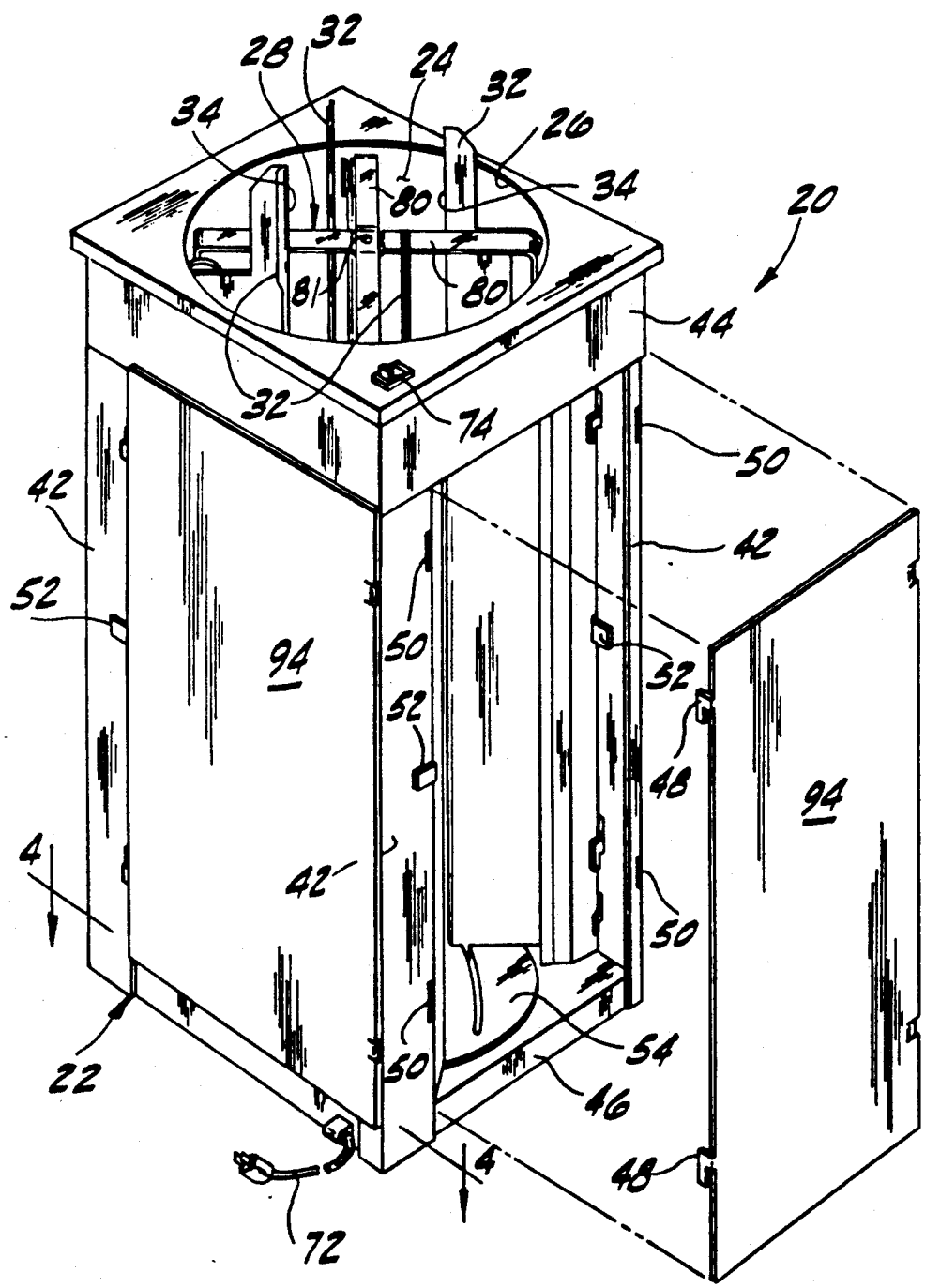
FIG. 1 is a perspective view of the dispenser of this invention with a side panel of the dispenser exploded to show internal detail.
Figure 2:
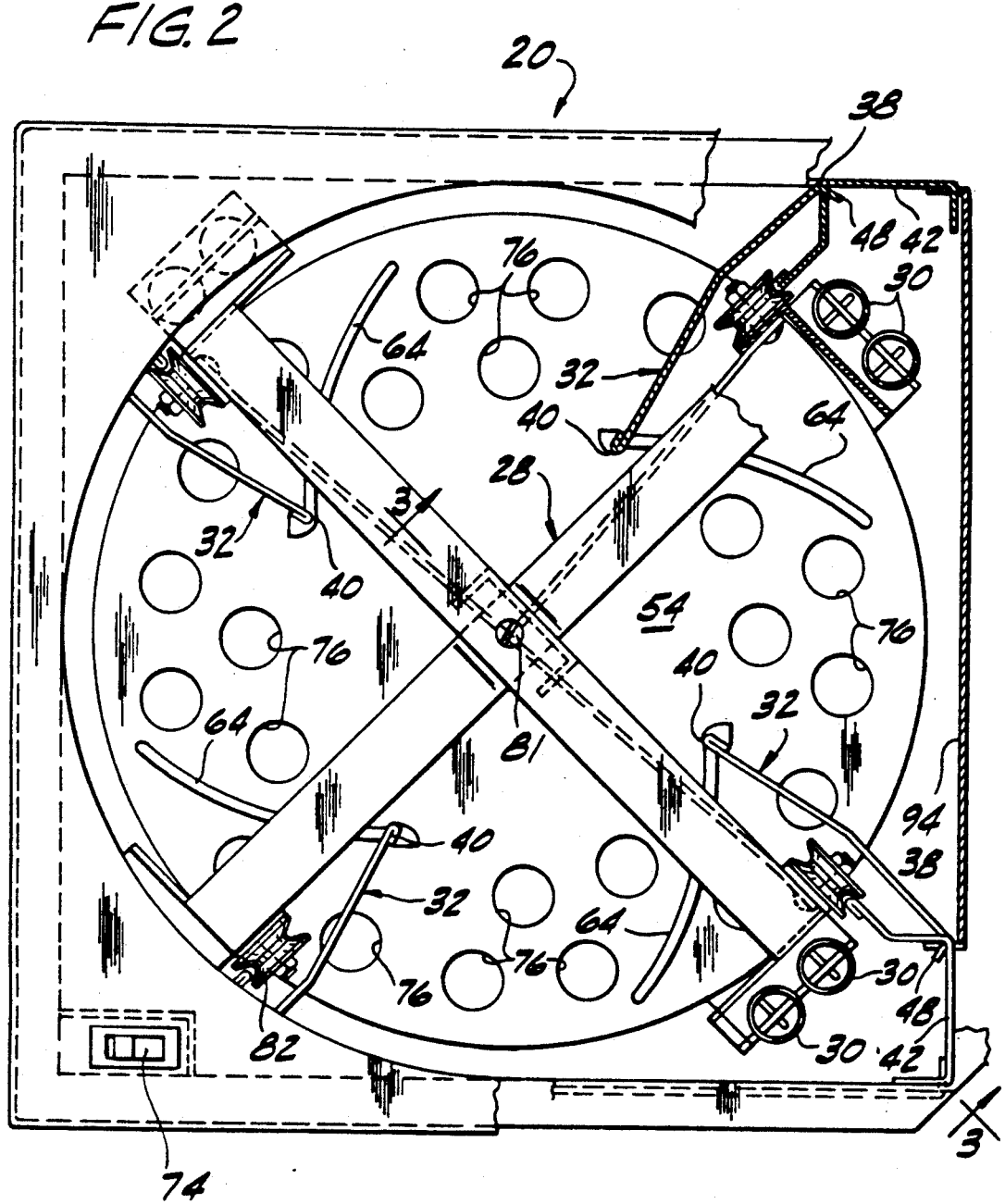
FIG. 2 is a top plan view of the dispenser of FIG. 1 with portions broken away to show detail.
Figure 3:
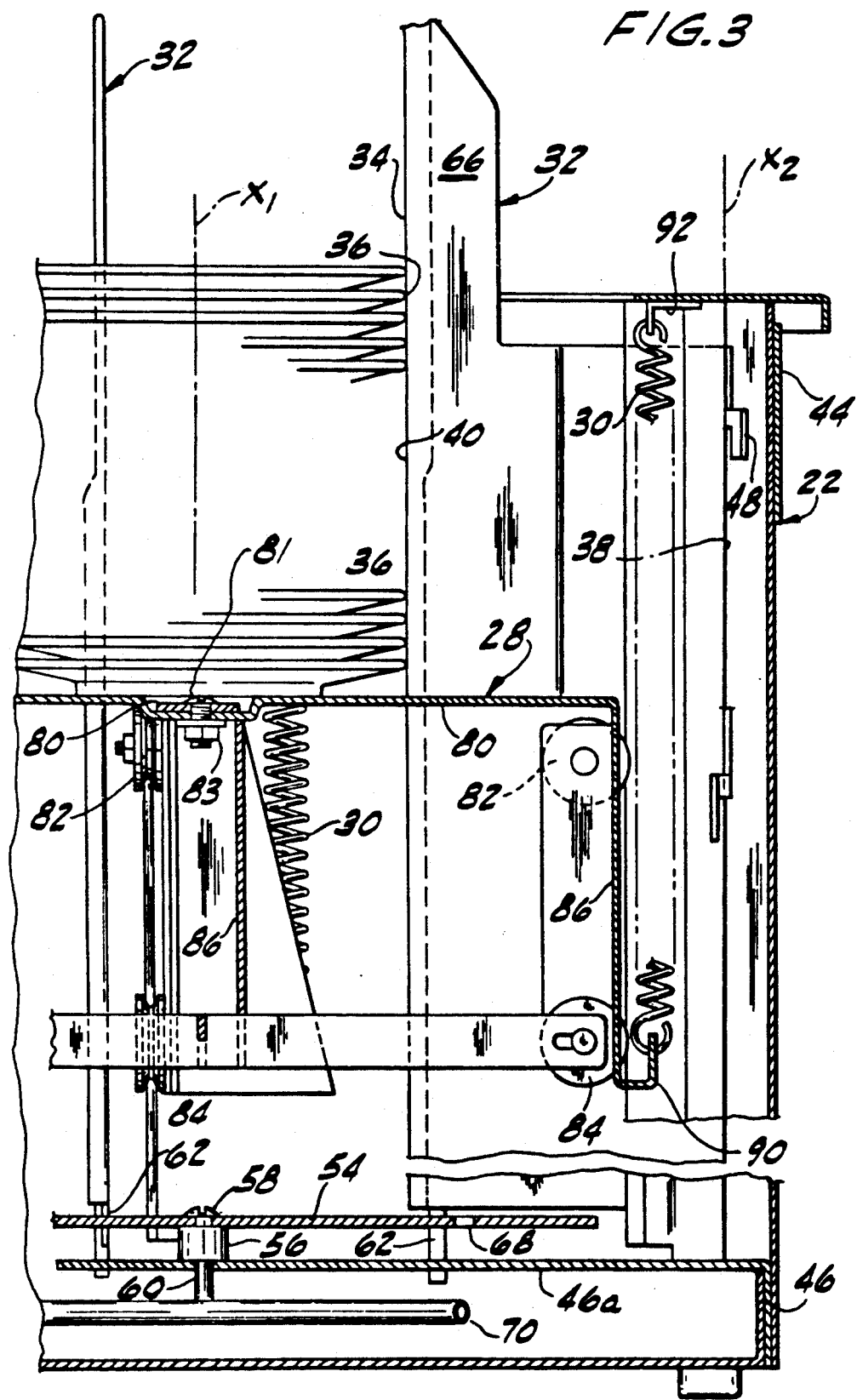
FIG. 3 is a partial section view taken along the plane of line 3—3 of FIG. 2 showing a stack of dishes supported by the carriage.
Figure 4:
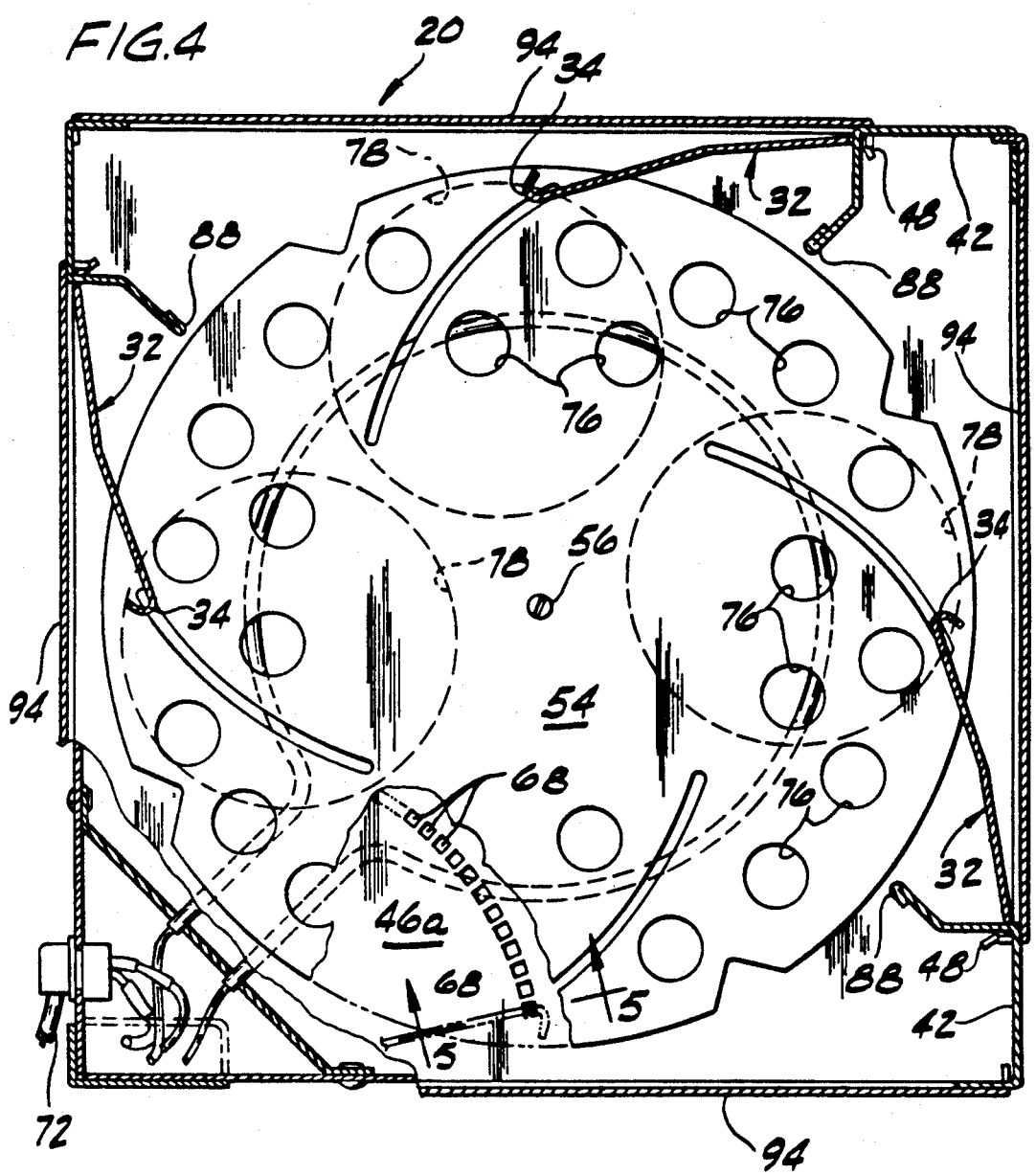
FIG. 4 is a section view taken along the plane of line 4—4 of FIG. 1 showing the turntable.
Figure 5:
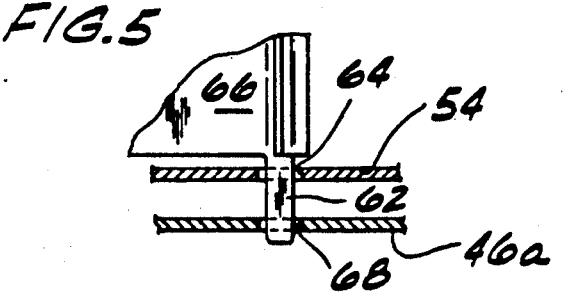
FIG. 5 is an elevational view taken along the plane of line 5—5 of FIG. 4 showing the bottom portion of the actuating guide member.

A dispenser constructed according to the principles of this invention is indicated generally as 20 in FIG. 1. The dispenser 20 is adapted for use in cafeterias, restaurants, etc., for dispensing stackable articles such as dishes and the like. The dispenser 20 comprises a housing 22 having an opening 24 at its top 26, a carriage 28 for supporting a generally vertical stack of dishes, a plurality of tension springs 30 constituting means for biasing the carriage vertically upwardly in the housing 22 to dispense the articles through the opening 24 in the top 26 of the housing 22, and a plurality of elongate guide members 32. The carriage 28 is moveable within the housing 22 along a generally vertical central axis $x_1$. The guide members 32 are spaced about the periphery of the carriage 28 for retaining the dishes in a generally vertical stack. Each guide member 32 has a vertically extending guide surface 34 for slideably abutting marginal edge portions 36 (shown in FIG. 3) of the dishes stacked on the carriage 28. As discussed below, the guide members 32 are mounted for coordinated movement of their respective guide surfaces 34 so that movement of one guide surface into position to accommodate dishes of a particular size and shape simultaneously moves the other guide surfaces into position to accommodate dishes of that size.

The guide members 32 are pivotally mounted to the housing 22 at a first edge margin 38 of the guide members 32. The guide members 32 are pivotable about generally vertical pivot axes $x_2$ (see FIGS. 3 and 6). Each pivot axis $x_2$ is generally parallel to the other pivot axes $x_2$ and to the central axis $x_1$. The guide members 32 also have second edge margins 40 which constitute the guide surfaces 34. Each guide surface 34 is spaced from and parallel to the pivot axis $x_2$ of its respective guide member 32 so that pivoting of the guide member varies the distance between the central axis $x_1$ and the guide surface 34. When the guide members 32 are pivoted so that the guide surfaces are relatively close to the central axis, then the dispenser 20 accommodates smaller dishes. When the guide members 32 are pivoted so that the guide surfaces 34 are farther from the central axis $x_1$, then the dispenser 20 accommodates larger dishes.

The housing 22 comprises a generally box-shaped frame formed of four parallel elongate channel members 42, a generally square-shaped top member 44 secured at each of its corners to the upper portion of one of the channel members, and a generally square-shaped bottom member 46 secured at each of its corners to the lower portion of one of the channel members 42. The bottom member 46 comprises a flat plate 46a generally normal to the central axis.

The mounting of the guide members 32 is specifically shown in FIGS. 6-9. Each guide member 32 has a plurality of hook-shaped tabs 48 adapted for insertion into a corresponding plurality of slots 50 in one of the channel members 42. The tabs 48 have hooked ends 48a which engage the channel members 42 when the tabs 48 are inserted into the slots 50 and then moved downward. The tab/slot arrangement allows each guide member 32 to pivot (swing) with respect to its corresponding channel member 42. After the tabs 48 have been inserted in their corresponding slots 50, clips 52 are attached to the channel members 42 and extend into the slots 50 to block upper portions of the slots 50. With the clips 52 in place, vertical movement of the guide members 32 is restricted because when a guide member 32 is moved upward, then the tab 48 abuts the clip 52. Thus, the clips constitute means for restricting vertical movement of the guide members 32. Also, because they block portions of the slots 50, the clips 52 prevent removal of the guide members 32 without first removing the clips 52.

As shown in FIGS. 2-6, the dispenser 20 includes a turntable 54 mounted on the bottom member 46 for rotation about the central axis $x_1$. The turntable 54 is mounted to the Plate 46a of the bottom member 46 by a shoulder pin 56. The shoulder pin 56 is secured to the bottom face of the turntable 54 by a screw 58 which extends through the center of the turntable 54 and is threaded into the top of the shoulder pin 56. A lower portion of the shoulder pin 56 extends through a hole 60 in the plate 46a and the shoulder of the pin 56 abuts the top face of the plate 46a. The turntable 54 and pin 56 both turn within the hole 60. Thus, the turntable 54 is rotatably mounted on the plate 46a.

Pins 62, constituting track followers, depend from the bottom of the guide member 32 and extend into corresponding slotted tracks 64 in the turntable 54. The pins 62 are preferably adjacent the second edge margins 40. Each pin 62 follows one of the tracks 64. The tracks 64 and pins 62 are configured so that turning of the turntable 54 causes the tracks 64 to push against the pins 62 to thereby cause the guide members 32 to simultaneously pivot, thereby varying the distances between the central axis $x_1$ and the guide surfaces 34. Also, pivoting one of the guide members 32 into position to accommodate dishes of a particular size causes the turntable 54 to rotate, which causes the other guide members 32 to pivot. Thus, the turntable 54, tracks 64, and pins 62, constitute means for mounting the guide members 32 for coordinated movement of their respective guide surfaces.

One of the guide members is referred to as an actuating guide member and is indicated generally as 66. Pivoting of the actuating guide member 66 causes the turntable 54 to turn, thereby causing the other guide members 32 to simultaneously pivot. The actuating guide member 66 is adapted to be locked in any selected one of a plurality of pivoted positions. The pin 62' extends through its corresponding track 64 and also extends through any one of a plurality of holes 68 in the plate 46a. The holes 68 correspond to the plurality of pivot positions. The pin 62' is the same length as the other pins 62 but the other pins 62 extend through large non-restricting clearance (vent) holes 78. Rather than having the pins 62 extend through the holes 78, it is to be understood that the pins 62 could be made shorter so that they extend through their corresponding tracks 64 but do not extend downwardly far enough to engage the plate 46a. When the pin 62' of the actuating guide member 66 extends into one of the holes 68, then the actuating guide member 66 is prevented from pivoting and, because of their linkage via the turntable, all of the other guide members 32 are prevented from pivoting. Because of the dimensions of the tab 48 of the actuating guide member 66 and the dimensions of the corresponding slot 50 and clip 52, the actuating guide member 66 can be lifted vertically upwardly a sufficient distance so that its pin 62' disengages the holes 68, but is restrained from vertical movement upwardly to a point where such pin 62' disengages its corresponding track 64. To vary the pivot position, the actuating guide member 66 is lifted so that its pin 62' disengages one of the holes 68, the guide member 66 is pivoted to another pivot position, and then the guide member 66 is lowered so that its pin 62' engages one of the other holes 68 and locks the actuating guide member 66 in position.

A heating element 70 (see FIG. 3) is located below the plate 46a for heating the stack of dishes. The heating element 70 is electrically operated and is provided with a thermostat (not shown), power cord 72, and a switch 74 (see FIG. 2) secured to the top member 44. Vent holes 78 and 76 are provided through the plate 46a and turntable 54, respectively, so that heated air can pass upwardly from the heating element 70 to heat the stack.

The carriage 28 supports the, stack of dishes. It comprises two inverted U-shaped cross members 80 secured together at the location where they criss-cross by a bolt 81 and mating nut 83. Upper and lower guide sheaves 82 and 84 are mounted to vertical legs 86 of the cross members 80. The sheaves can be mounted for rolling or can be fixed to the legs 86. The sheaves 82 and 84 engage with and ride along vertical edge margins 88 of the channel members 88. The sheaves 82 and 84 and the edge margins 88 guide the carriage 28 for vertical movement and prevent canting of the carriage 28.

Each leg 86 includes an upwardly turned foot 90 at its lower end. Each foot 90 has a plurality of apertures (preferably three) so that the lower ends of the tension springs 30 can be hooked through the apertures. Brackets 92 are secured to the lower face of the top member 44 and located directly above the feet 90. The brackets 92 each have a plurality of apertures so that the upper ends of the springs 30 can be hooked therethrough. Thus, the springs 30 bias the carriage 28 vertically upwardly. Preferably, the springs are selected with appropriate spring constants so that the top of the stack of dishes maintains a substantially constant level regardless of the number of dishes in the stack. If heavy dishes are dispensed from the dispenser 20, then springs 30 having relatively high spring constants will be necessary to maintain this constant level or, alternatively, two or more springs 30 can be secured in parallel between each foot 90 and its corresponding bracket 92. So that the springs 30 fit within a compact area, a spring having a small diameter coil can be placed inside a spring having a larger diameter coil, with the lower ends of the two springs hooked to one aperture through the foot 90 and the upper ends hooked to one aperture through the bracket 92. If lighter or heavier dishes are to be dispensed, one of the two springs can be removed, or one or both springs can be replaced by another spring, or additional springs can be added.

As shown in FIG. 1, the dispenser 20 further includes side panels 94. The side panels 94 have hooked tabs 96, similar to tabs 48, for insertion into a corresponding plurality of slots 98 in the channel members 42.

In operation, the springs 30 are selected to accommodate the weight of dishes to be dispensed. One or more the dishes are placed on the carriage 28. The actuating guide member 66 is lifted vertically to disengage its pin 62' from one of the holes 68 and then the guide member 66 is pivoted toward the dish until all of the guide surfaces 34 abut the dish. The activating member 66 is then lowered so that its pin 62 engages the hole 68 corresponding to that pivot position. The rest of the dishes can then be stacked on the carriage 28. Thus, all of the guide members 32 are simultaneously adjusted to accommodate stacks of articles of different diameters. The dispenser 20 can also accommodate dishes having an oval shape or some other non-circular shape. It accommodates non-circular dishes as well as circular dishes because it has at least four guide surfaces 34. It is to be understood that the dispenser 20 could be modified to have more than or less than four guide surfaces without departing from this invention.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A dispenser for stackable articles such as dishes and the like, the dispenser comprising:
   a housing having an opening in its top;
   a carriage, within the housing and moveable along a generally vertical central axis of the housing, for supporting a generally vertical stack of the articles;
   means for biasing the carriage vertically upwardly in the housing to dispense the articles from the opening in the top of the housing;
   a plurality of elongate guide members in the housing and spaced about the periphery of the carriage for retaining the articles in a generally vertical stack, each guide member having a vertically extending guide surface for slideably abutting marginal edge portions of the articles stacked on the carriage; and
   means for mounting the guide members for coordinated movement of their respective guide surfaces so that movement of one guide surface into position to accommodate articles of a particular size simultaneously moves the other guide surfaces into position to accommodate articles of that size.

2. The dispenser of claim 1 wherein the mounting means comprises means for pivotally mounting each guide member about a generally vertical pivot axis, each pivot axis being generally parallel to and spaced from the central axis, each guide surface being spaced from and parallel to the pivot axis of its respective guide member so that pivoting of the guide member varies the distance between the central axis and the guide surface.

3. The dispenser of claim 2 wherein the mounting means comprises:
   a turntable, rotatably mounted on the housing for rotation about the central axis, having a plurality of tracks therein; and
   track followers on the bottom of the guide members each following one of the tracks of the turntable, the tracks and the track follower configured so that turning of the turntable about the central axis causes all of the guide members to pivot, varying the distances between the central axis and the guide surfaces.

4. The dispenser of claim 3 wherein the turn-table can be turned by pivoting one of the guide members.

5. The dispenser of claim 4 further comprising means for locking said one guide member in any selected one of a plurality of pivot positions.

6. The dispenser of claim 5 wherein each of said tracks comprises a slot in the turntable and each of said track followers comprises a pin on the bottom of each of the guide members and extending into one of the slots.

7. The dispenser of claim 6 wherein the locking means comprises a plate, constituting a portion of the housing, lying in a plane generally normal to the central axis and positioned below the turntable, the plate having a plurality of holes corresponding to the plurality of Pivot positions of said one guide member for receiving the pin of said one guide member, whereby when the pin of said one guide member is inserted through its corresponding slot and into any one of the holes then said one guide member is prevented from pivoting.

8. The dispenser of claim 7 further comprising means for restricting vertical movement of said one guide member where a said one guide member is free to move vertically upwardly to disengage the pin of said one guide member with one of the holes but is restrained from vertical movement upwardly to a point where such pin disengages its corresponding slot.

9. The dispenser of claim 8 wherein the housing includes side portions enclosing the guide members and carriage, and further comprising means for pivotally mounting the guide members to the side portions.

10. The dispenser of claim 9 wherein the mounting means comprises a plurality of generally planar hook-shaped tabs on each guide member and adjacent the guide member's corresponding pivot axis, and a plurality of generally vertical slots in the side portions of the housing for receiving the tabs of the guide members, the vertical slots corresponding with the tabs of said one guide member being sufficiently long to enable said one guide member to be moved upwardly to disengage the pin of said one guide member with the holes.

11. The dispenser of claim 10 wherein the means for restricting vertical movement of said one guide member comprises a clip for extending into one of the vertical slots corresponding with one of the tabs of said one guide member and for attachment to one of the side portions, said one tab abutting the clip and restraining upward movement of said one guide member beyond a predetermined distance.

12. The dispenser of claim 1 wherein the biasing means comprises a plurality of tension springs having upper ends fixed with respect to the housing and lower ends secured to the carriage, the springs being selected with predetermined spring constants so that the top of the stack of articles maintains a substantially constant vertical level regardless of the number of articles in the stack.

13. The dispenser of claim 12 wherein said biasing means balances the weight of the stack of articles such that the top of the stack of articles is maintained at a substantially constant vertical level regardless of the number of articles in the stack.

* * * * *